United States Patent [19]

Schedrat et al.

[11] Patent Number: 5,438,881
[45] Date of Patent: Aug. 8, 1995

[54] ARRANGEMENT OF MEASURING DEVICES ON A SEMITRAILER MOTOR VEHICLE

[75] Inventors: Kurt Schedrat, Gaienhofen; Lothar Jakob, Blumberg; Dirk Engles, Tengen, all of Germany

[73] Assignee: Georg Fischer Verkehrstechnik GmbH, Singen, Germany

[21] Appl. No.: 197,215

[22] Filed: Feb. 16, 1994

[30] Foreign Application Priority Data

Feb. 17, 1993 [CH] Switzerland .................. 489/93

[51] Int. Cl.⁶ .................................. G01L 5/13
[52] U.S. Cl. .................... 73/862.57; 280/504
[58] Field of Search ............ 73/865.8, 862.57, 768, 73/767, 781

[56] References Cited

U.S. PATENT DOCUMENTS

| | | | |
|---|---|---|---|
| 3,780,817 | 12/1973 | Videon | 73/767 |
| 4,405,146 | 9/1983 | Mitchell | 280/432 |
| 4,477,100 | 10/1984 | Elyakim | 280/434 |
| 4,702,488 | 10/1987 | Baillie | 280/426 |
| 5,026,085 | 6/1991 | Ducote | 280/426 |
| 5,060,965 | 10/1991 | Haefner et al. | 280/504 |
| 5,152,544 | 10/1992 | Dierker, Jr. et al. | 280/432 |
| 5,230,392 | 7/1993 | Tremblay | 177/137 |
| 5,294,143 | 3/1994 | Järvinen | 280/425.1 |

*Primary Examiner*—Richard E. Chilcot, Jr.
*Assistant Examiner*—James M. Olsen
*Attorney, Agent, or Firm*—Bachman & LaPointe

[57] ABSTRACT

The present invention relates to the arrangement of measuring devices on a semitrailer motor vehicle having a tractive unit, a semitrailer unit and a fifth wheel fastened to the tractive unit. The measuring devices(s) in each arrangement are disposed between the fifth wheel and the semitrailer. In one embodiment, a force sensor for measuring tractive and acceleration forces is disposed on a coupling claw forming part of a locking mechanism associated with the fifth wheel. In the same embodiment, a measuring device for measuring impact and pressure forces arising during braking is operationally connected to a movably mounted contact part forming part of the locking mechanism. Alternative embodiments of the present invention showing different measuring arrangements are also disclosed.

7 Claims, 2 Drawing Sheets

ARRANGEMENT OF MEASURING DEVICES ON A SEMITRAILER MOTOR VEHICLE

BACKGROUND OF THE INVENTION

The present invention relates to an arrangement of measuring devices on a semitrailer motor vehicle having a tractive unit, a semitrailer and a fifth wheel fastened to the tractive unit for influencing and improving the driving behavior of the vehicle.

It is a known practice to provide semitrailer motor vehicles having a fifth wheel with measuring devices for measuring the wear on certain parts. This is done so that reliable operation may be guaranteed through early replacement of worn parts.

From a safety standpoint, it is also desirable to measure certain forces arising between the semitrailer and the tractive unit at their connection parts to influence and improve the driving behavior of the vehicle. These forces include impact and pressure forces as well as tractive forces.

Accordingly, it is a principal object of the present invention to provide an arrangement of measuring devices by means of which an influencing and improvement of the driving behavior of the vehicle can be achieved for different loads.

Further objects and advantages of the present invention will appear hereinbelow.

SUMMARY OF THE INVENTION

The present invention relates to an arrangement of measuring devices on a semitrailer motor vehicle having a tractive unit, a semitrailer and a fifth wheel fastened to the tractive unit for influencing and improving the driving behavior of the vehicle.

In accordance with the present invention, the measuring arrangement of the present invention comprises means for measuring forces arising between the semitrailer and the tractive unit at connection parts connecting the semitrailer and the tractive unit. The measuring means are disposed between the semitrailer and the fifth wheel. In a first embodiment of the present invention, measuring means are disposed on the locking mechanism associated with the fifth wheel. The measuring means in this embodiment includes first measuring means for measuring tractive forces disposed on a coupling claw forming part of the locking mechanism and/or second measuring means for measuring impact and pressure forces operationally connected to a contact part which forms part of the locking mechanism. The measuring means in this embodiment also includes means for measuring the weight of the semitrailer. In another embodiment of the present invention, the measuring means are disposed on a kingpin which forms part of the connection between the semitrailer and the fifth wheel. Other features of the measuring arrangement of the present invention are set out in the following description and the accompanying drawings. The various embodiments of the measuring arrangement of the present invention are superior to measuring arrangements heretofore known.

BRIEF DESCRIPTION OF THE DRAWINGS

FIG. 3b is a bottom view of the arrangement shown in FIG. 3a.

DETAILED DESCRIPTION

Figure 1:
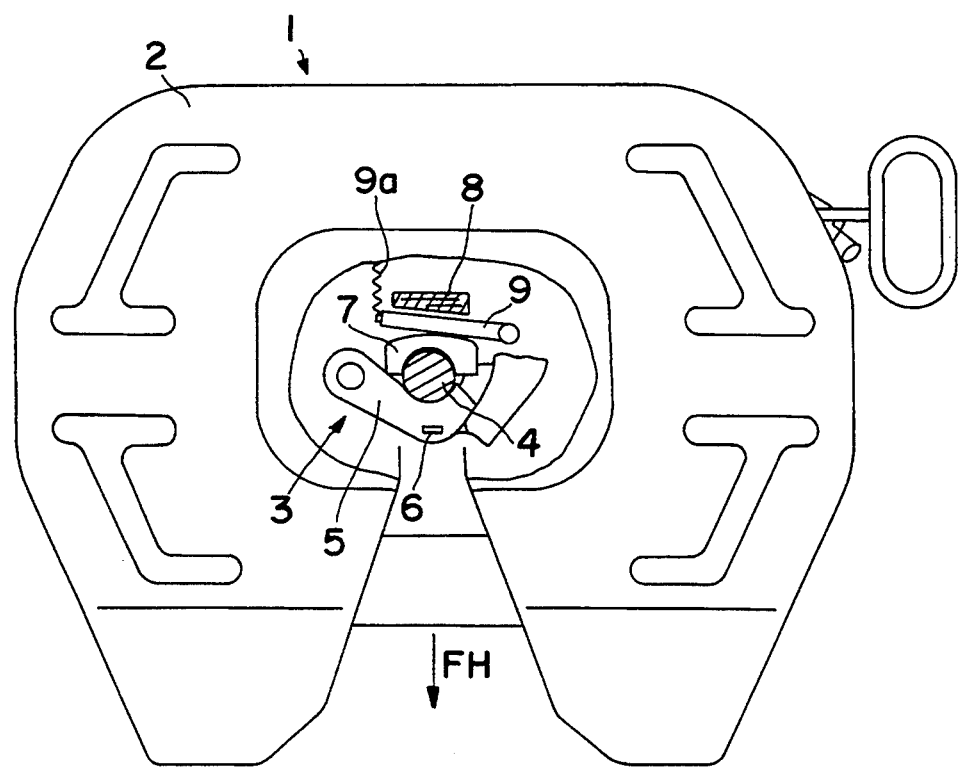
FIG. 1 is a plan view of a fifth wheel of a semitrailer motor vehicle having measuring devices disposed on parts of a locking mechanism associated with the fifth wheel.

FIG. 1 illustrates a first embodiment of a measuring arrangement in accordance with the present invention. As previously discussed, the measuring arrangement is used on a semitrailer motor vehicle having a tractive unit, a semitrailer, and a fifth wheel fastened to the tractive unit by any suitable means known in the art. FIG. 1 illustrates a fifth wheel 1 having a coupling plate 2 and a locking mechanism 3 for receiving and securing a fifth-wheel kingpin 4 mounted to a semitrailer so as to connect the semitrailer and the tractive unit. As shown therein, the locking mechanism 3 has a coupling claw 5. Disposed on the coupling claw 5 is a measuring device 6, preferably in the form of a force sensor, for measuring forces which arise between the semitrailer and the tractive unit. While force sensor 6 may be any suitable sensor known in the art it is preferred that it be a strain gauge.

Tractive forces and acceleration forces arising between the tractive unit and the trailer or semitrailer are transmitted to the claw 5 and measured by the measuring device 6. The measured force values are fed to an evaluation device (not shown) to influence and improve the driving behavior of the vehicle. In this arrangement, the tractive forces act directly from the fifth-wheel kingpin 4 onto the coupling claw 5, where they are measured by device 6.

Pressure and impact forces arising between the trailer or semitrailer and the tractive unit during braking are transmitted by the fifth-wheel kingpin 4 onto a movably mounted contact or wearing part 7 which forms part of the locking mechanism 3. To measure these pressure and impact forces, the contact part 7 is operationally connected to a measuring device 8. The measuring device 8 may be any suitable measuring device known in the art, such as a force sensor disposed on the contact part 7.

In the measuring arrangement shown in FIG. 1, the contact part 7 is supported in a longitudinally displaceable manner and is held by spring action via a lever 9 in a position delimited by stops. A pressure force arising during braking is transmitted from the fifth-wheel kingpin 4 onto the contact part 7, which is displaced, from its original position. The displacement distance, which is indicative of the pressure force, or the pressure force itself is measured via the lever 9 and the operatively connected measuring device 8 disposed behind the lever. The measuring device 8 may be a displacement sensor or a force sensor. In the case of displacement measurement, the force may be determined by means of the spring constant of a pressure spring 9a disposed on or associated with the lever 9.

Figure 2:
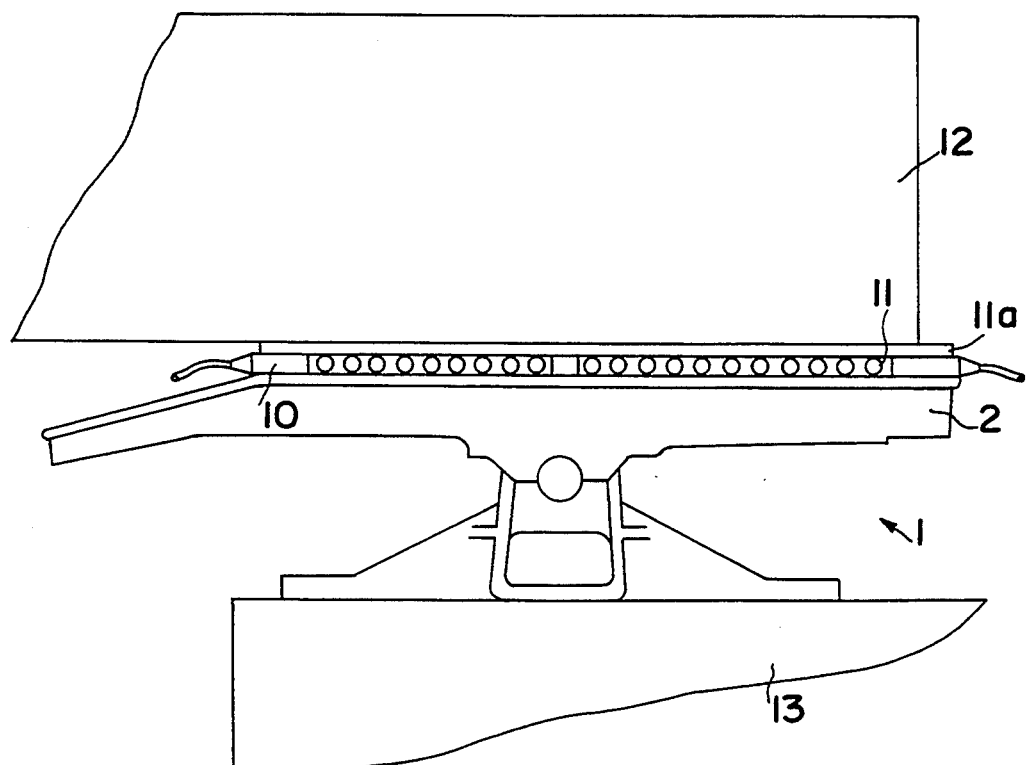
FIG. 2 is a side view of the fifth wheel shown in FIG. 1 having means for measuring the weight of the semitrailer disposed between the semitrailer and a coupling plate of the fifth wheel.

To allow the tractive and pressure forces to be transmitted from the semitrailer 12 to the locking mechanism 3 as far as possible without high frictional resistance, a fifth-wheel support 11 is provided between the semitrailer 12 and the coupling plate 2, which support 11 is made from a low-friction construction. As shown in FIG. 2, the support may have a construction which includes an arrangement of rolling elements. Alternatively, the support 11 may include a coating on the supporting surfaces formed from a material with a low coefficient of friction or air or oil cushions.

For measuring the force(s) exerted vertically upon the tractive unit 13 by the weight of the semitrailer 12, measuring devices 10, preferably in the form of force sensors, are disposed between a fifth-wheel support plate 11a and the coupling plate 2. The results of the weight measurement taken by the devices 10 are also fed to an evaluation device (not shown) so that the driving behavior of the vehicle may also by influenced by the weight measurement.

Figure 3A:
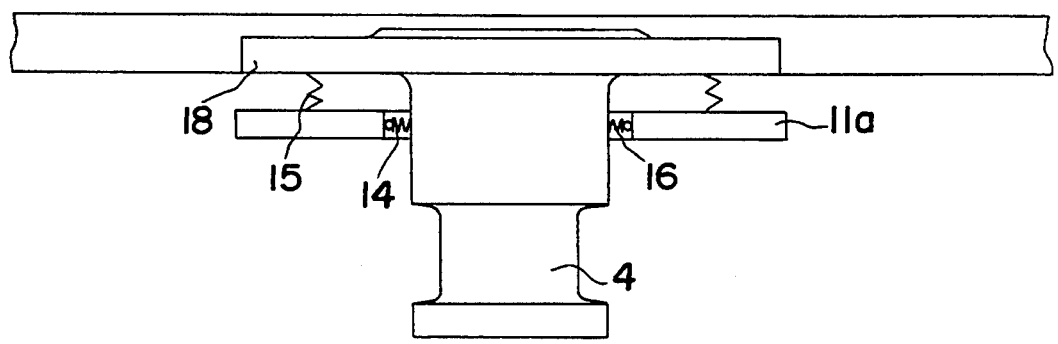
FIG. 3a illustrate an alternative embodiment wherein measuring devices are arranged on a fifth-wheel kingpin and on a support structure for the kingpin.
Figure 3B:
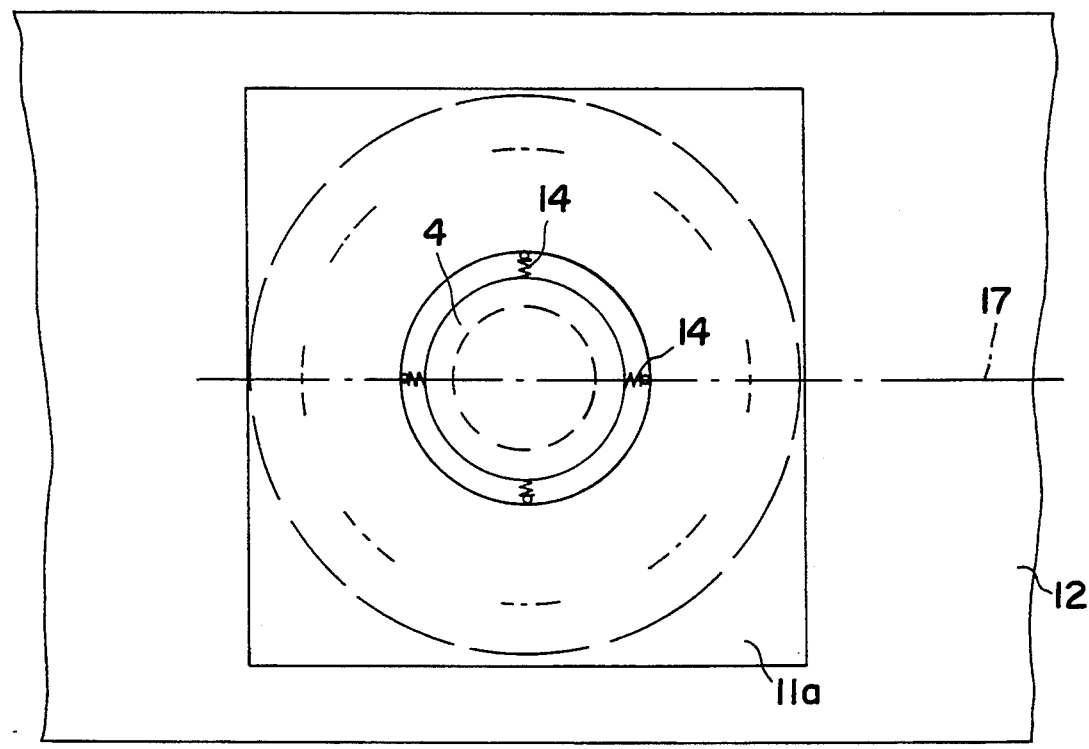

FIGS. 3a and 3b illustrate an alternative measurement arrangement wherein measuring devices 14 and 15 for measuring forces which arise between the semitrailer and the tractive unit are disposed on a fifth-wheel kingpin 4 fastened to the semitrailer 12, which kingpin forms part of the connection between the semitrailer and the tractive unit. The fifth-wheel kingpin 4 is preferably connected in an elastically radial and axially movable manner to the fifth-wheel support plate 11a. The elastic mounted of the fifth-wheel kingpin 4 may be effected by means of elastomeric or rubber elements (not shown). For measuring tractive, impact and laterally effective forces, four measuring devices 14 in the form of force sensors preferably are disposed between the walls of a bore 16 in the fifth-wheel support plate 11a and the fifth-wheel kingpin 4. Two of the devices 14 are disposed along or parallel to the direction of the vehicle longitudinal axis 17 and two of the devices are disposed at right angles thereto. Measuring devices 15 for measuring the weight of the semitrailer 12 are disposed between a flange 18 of the fifth-wheel kingpin 4 and the fifth-wheel support plate 11a. As before, the measurements may be fed to an evaluation device (not shown) to influence and improve the driving behavior of the vehicle.

While the devices 14 and 15 are preferably force sensors, it should be recognized that displacement sensors may be used as measuring means 14 and 15. In such an arrangement, the force is determined by means of the spring constants of elastomeric elements or by pressure springs disposed in their place.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. An arrangement of measuring devices on a semitrailer motor vehicle having a tractive unit, a semitrailer and a fifth wheel for connecting the tractive unit and the semitrailer, said measuring arrangement comprising means for measuring forces arising between the semitrailer and the tractive unit at connection parts connecting the semitrailer and the tractive unit, said measuring means being disposed between the semitrailer and the fifth wheel, said fifth wheel having a locking mechanism associated therewith, said locking mechanism including a coupling claw and said measuring means includes means for measuring tractor forces acting on said coupling claw.

2. An arrangement according to claim 1 further comprising said fifth wheel including a coupling plate and a fifth-wheel support, said fifth-wheel support being positioned between the semitrailer and said coupling plate, and said coupling plate having a low-friction construction.

3. An arrangement of measuring devices on a semitrailer motor vehicle having a tractive unit, a semitrailer and a fifth wheel for connecting the tractive unit and the semitrailer, said measuring arrangement comprising means for measuring forces arising between the semitrailer and the tractive unit at connection parts connecting the semitrailer and the tractive unit, said measuring means being disposed between the semitrailer and the fifth wheel said fifth wheel having a locking mechanism associated therewith, said locking mechanism including a contact part and said measuring means includes means for measuring impact and pressure forces operationally connected to said contact part.

4. An arrangement of measuring devices on a semitrailer motor vehicle having a tractive unit, a semitrailer and a fifth wheel for connecting the tractive unit and the semitrailer, said measuring arrangement comprising means for measuring forces arising between the semitrailer and the tractive unit at connection parts connecting the semitrailer and the tractive unit, said measuring means being disposed between the semitrailer and the fifth wheel wherein said fifth wheel kingpin is fastened to the semitrailer, a fifth-wheel support plate having a bore with walls, and said measuring means including a plurality of measuring devices disposed between the kingpin and the walls of the bore.

5. An arrangement according to claim 4 further comprising said vehicle having a longitudinal axis and said plurality of measuring devices including two devices disposed parallel to the longitudinal axis and two devices at right angles thereto.

6. An arrangement according to claim 4 wherein the measuring means further includes two devices for measuring the weight of the semitrailer disposed between a flange of the kingpin and the fifth-wheel support plate.

7. An arrangement of measuring devices on a semitrailer motor vehicle having a tractive unit, a semitrailer and a fifth wheel for connecting the tractive unit and the semitrailer, said measuring arrangement comprising means for measuring forces arising between the semitrailer and the tractive unit at connection parts connecting the semitrailer and the tractive unit, said measuring means being disposed between the semitrailer and the fifth wheel wherein said connection parts includes a kingpin and said measuring means are disposed on the kingpin.

* * * * *